Patented Apr. 18, 1950

2,504,620

UNITED STATES PATENT OFFICE 2,504,620

PROCESS OF MANUFACTURING STABILIZED NUT BUTTERS

Fitzhugh L. Avera, Alameda, Calif., assignor to Rosefield Packing Company, Ltd., Alameda, Calif., a corporation of California No Drawing. Application July 6, 1948, Serial No. 37,303

1 Claim. (Cl. 99—128)

The invention, in general, relates to nut butter production and more particularly relates to an improved process of preparing nut butters with hydrogenated stabilizers to afford end products substantially devoid of taste sensations of waxiness or of unctuosity.

In the development of improvements in the art of nut butter manufacture, considerable attention has heretofore been devoted to the prevention or arresting of oil separation. A large percentage of producers have to a large extent, solved this primary problem by introducing hydrogenated oil or other hydrogenated material as a stabilizer but have encountered a detrimental aspect in such stabilization, as well as in specific stabilizers, per se, in that the end products have unsatisfactory taste sensations. The present invention is directed to obviating inherent disadvantages of hydrogenated stabilizers heretofore employed in the art as well as deleterious aspects thereof.

A primary object of the invention is to provide an improved process of producing stabilized nut butters free of deleterious substances affecting the taste and smoothness of the end products.

Another important object of my invention is to provide an improved hydrogenated stabilizer eminently suitable for application to nut butters and which is capable of facile manufacture and introduction into the nut butters during their manufacture.

A still further object of the present invention is to provide improved stabilized nut butters substantially devoid of the taste sensation of either waxiness or unctuosity.

Another object of my present invention is to provide an improved process of the indicated nature wherein no additional expenses of manufacture are involved but wherein, at the same time, better quality and more palatable nut butters are produced.

The foregoing and other objects are attained, as will appear from the following description, from following the herein described preferred embodiment of the improved process utilizing my improved stabilizer to obtain preferred embodiments of improved end products. It is to be understood that I am not to be limited to the precise order of steps of the process as my invention, as defined in the appended claim, can be carried out in a plurality of variations of such order of steps as set forth.

While the present improvement is entirely suitable for application to the manufacture of a variety of different nut butters and types thereof, the process has been specially adapted to the manufacture of peanut butters and, accordingly, I shall describe the invention in that environment.

In my improved process, as applied to the manufacture of peanut butters, the initial customary steps in such manufacture are carried, which include roasting, shelling and blanching a quantity of peanuts. Thereafter, the peanuts are ground or comminuted in conventional grinding mills or comminuting equipment. I then preferably remove from the ground or comminuted peanuts an appreciable percentage of the peanut oil, employing suitable hydraulic or expeller means, as desired. In some instances, depending upon the particular type of peanuts utilized for producing the nut butter, either all or a lesser percentage of the natural peanut oil can be expressed from the oil for reintroduction into the ground or comminuted mass in hydrogenated form as hereinafter explained. However, it is to be further understood that it is not essential to the production of my improved end products that natural peanut oil from the peanuts being employed be utilized and hydrogenated. That is to say it is entirely within the scope and purview of the present invention that other suitable edible oils, such as cotton-seed oil or other vegetable oil in the class of peanut oil, can be used in the hydrogenation process for subsequent introduction into the ground or comminuted peanuts during the manufacture of the nut butter to provide the stabilized end product free of oil separation as well as possessing the desirable palatable qualities herein specified.

In accordance with my improved process, a hydrogenated edible oil of predetermined structure is first manufactured for introduction into the mass of comminuted nuts, and it is to be clearly understood that the process of hydrogenation of the oil is critical in that such process is not carried beyond a definite stage of hydrogenation; namely not past the start of an increase in saturate structures. As is well known to those skilled in the art of hydrogenation of edible oils for use as stabilizers in peanut butter manufacture to arrest or prevent oil separation and to obtain a desirable range of plasticity in the end product, it has been the practice to increase the saturates by hydrogenation until iodine values have reached a very low figure indicating that the majority of all the $C_{16}$ and $C_{18}$ structures have reached full saturation. Optimum concentrations of hydrogenated oil heretofore manufactured and employed as nut butter stabilizers, and affording desirable ranges of plasticity, nevertheless provide end products having a taste sensation of either waxiness, or unctuosity, or both. It is recognized that this unctuous or waxy taste is a function of the increased percentage of saturate structures, such as glycerides of stearic and palmitic acids.

In accordance with my present invention, I have carried and do carry the oil hydrogenation process to the critical point where the saturates just start to show an increase, and at that critical point I stop hydrogenation. As is well known, the start of the hydrogenation process or sequence of advancing melting points is accompanied by a reduction in polyethenoid structures; the saturates or saturate components initially remaining unchanged. Also, as is well known, that during the early phase of the hydrogenation process the double bonded structures advance to the unsaturate 9, 10 octadecenoic glycerides which cyclically hydrogenate and dehydrogenate producing transisomeric forms. The trans 9, 10 octadecenoic isomers thus produced raise the melting point of the hydrogenating oil mixture but, as stated above, the saturate structures present, such as the glycerides of stearic and palmitic acids, are not increased at this early stage of hydrogenation. By carrying on hydrogenation further, additional reduction in polyethenoid structures is effected but I only carry on hydrogenation until the saturate components just start to increase at which point hydrogenation is stopped and my improved stabilizer is attained. This is critical, and I have found that in addition to affording a hydrogenated oil stabilizer that is highly effective in effecting desirable ranges of plasticity in the end products that are free from oil separation, I have also provided an end product which is substantially free of the taste sensations of waxiness and unctuosity.

It is to be understood that the appended claim is to be accorded a range of equivalents commensurate in scope with the advance made over the prior art.

I claim:

A process of preparing a stabilized nut butter comprising introducing into the components of a nut butter during the manufacture thereof an hydrogenated oil stabilizer containing an edible oil which has been hydrogenated only to the point of maximum trans 9, 10 octadecenoic formation.

FITZHUGH L. AVERA.

REFERENCES CITED

The following references are of record in the file of this patent:

UNITED STATES PATENTS

| Number | Name | Date |
|---|---|---|
| 1,445,174 | Rosenfield | Feb. 13, 1923 |
| 1,528,077 | Rosenfield | Mar. 3, 1925 |
| 1,716,152 | Rosenfield | June 4, 1929 |